US006971101B1

(12) United States Patent
Clayton et al.

(10) Patent No.: US 6,971,101 B1
(45) Date of Patent: Nov. 29, 2005

(54) MANAGING ASYNCHRONOUS REQUESTS FOR USER INTERFACE RESOURCES IN AN INFORMATION SYSTEM

(75) Inventors: Mark Clayton, Phoenix, AZ (US); Merlin Smith, Chandler, AZ (US); Kungwel Mike Liu, Chandler, AZ (US); Patrick A. Stadler, Gilbert, AZ (US); Ryan J. Kummet, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 714 days.

(21) Appl. No.: 09/659,973

(22) Filed: Sep. 12, 2000

(51) Int. Cl.[7] .................................................. G06F 9/46
(52) U.S. Cl. ....................................... 718/103; 709/201
(58) Field of Search ................................ 709/100, 102, 709/104, 200–210, 310, 313, 314, 320; 710/260–269; 718/100, 102–104, 107–108; 719/310, 313–314, 719/318, 320

(56) References Cited

U.S. PATENT DOCUMENTS

| | | | | |
|---|---|---|---|---|
| 5,774,668 | A * | 6/1998 | Choquier et al. | 709/223 |
| 6,003,061 | A * | 12/1999 | Jones et al. | 709/104 |
| 6,092,178 | A * | 7/2000 | Jindal et al. | 712/27 |
| 6,130,757 | A * | 10/2000 | Yoshida et al. | 358/1.15 |
| 6,304,906 | B1 * | 10/2001 | Bhatti et al. | 709/227 |
| 6,438,630 | B1 * | 8/2002 | DeMoney | 710/56 |
| 6,578,064 | B1 * | 6/2003 | Saito et al. | 718/103 |
| 6,665,701 | B1 * | 12/2003 | Combs et al. | 709/104 |
| 6,775,729 | B1 * | 8/2004 | Matsuo et al. | 710/263 |
| 6,801,949 | B1 * | 10/2004 | Bruck et al. | 709/232 |

* cited by examiner

*Primary Examiner*—St. John Courtenay, III
*Assistant Examiner*—G. L. Opie
(74) *Attorney, Agent, or Firm*—Kevin D. Wills; Brian M. Mancini

(57) ABSTRACT

An embodiment of the invention includes an information appliance system (100) having an information appliance device (102) with a focus manager (206). Among other things, the focus manager is disposed to manage a plurality of asynchronous entities (214). Focus manager (206) receives an asynchronous request (209), stores it in a queue (250) and assigns it a priority level (252, 254, 256). Based on the priority level (252, 254, 256), an asynchronous entity (214) takes over control of user interface device resources from an entity (210), utilizes the resources, and returns them to the entity (210).

20 Claims, 4 Drawing Sheets

400

MANAGING ASYNCHRONOUS REQUESTS FOR USER INTERFACE RESOURCES IN AN INFORMATION SYSTEM

FIELD OF THE INVENTION

This invention relates generally to an information appliance system and, in particular to an information appliance system having a focus manager and method.

BACKGROUND OF THE INVENTION

Numerous applications are available to run on an electronic device either simultaneously or consecutively. However, not all of these applications are written to coexist with each other. In other words, not all applications "behave" well together. In some instances, one application will interrupt another application causing problems ranging from inconvenience to the user of the electronic device all the way up to fatal system errors. In another example, a user-selected application can be interrupted by a non-user selected application despite the relative importance or priority of the non-user selected application. This again causes user inconvenience and makes use of the electronic device and accompanying applications frustrating and inefficient for the user.

Accordingly, there is a significant need for a system and method that overcomes the deficiencies outlined above.

BRIEF DESCRIPTION OF THE DRAWINGS

Referring to the drawing.

Figure 1:
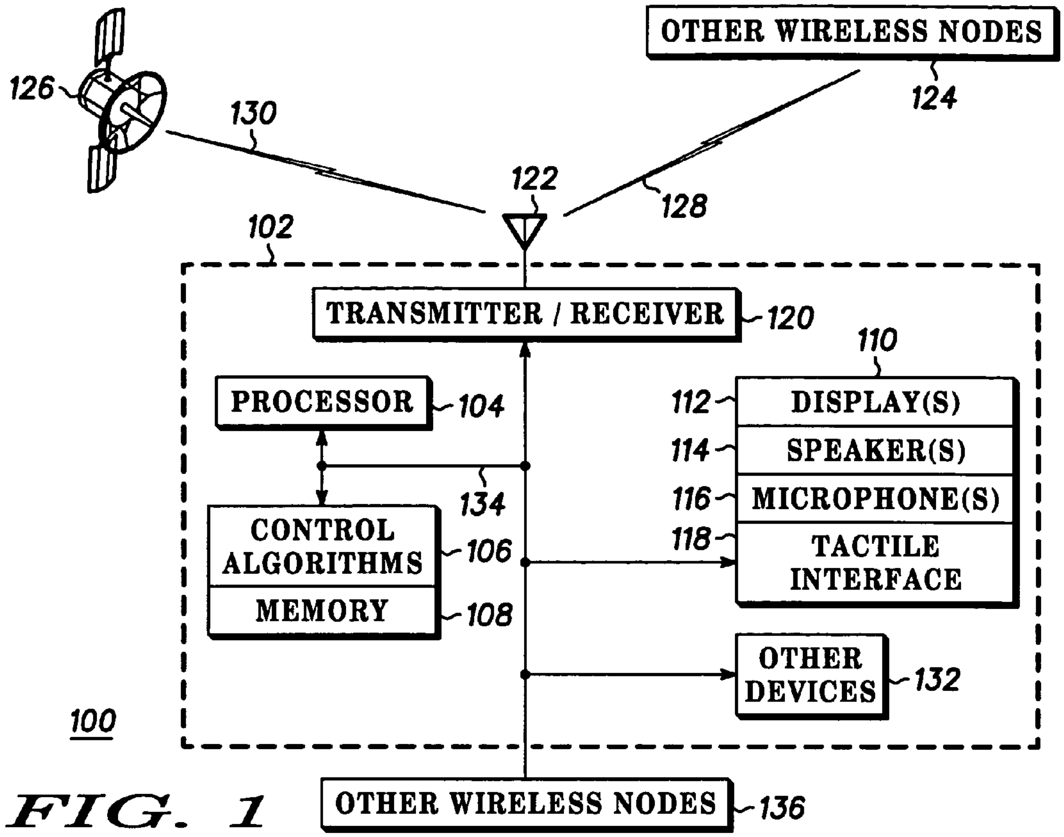
FIG. 1 depicts an exemplary information appliance system.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

FIG. 1 depicts an exemplary information appliance system 100. As shown in FIG. 1, information appliance system 100 comprises an information appliance device 102, which can, without limitation, transmit and receive data from other devices. For example, information appliance device 102 can be connected by wireless means to other wireless nodes 124, a satellite 126, by wireline means to other wireline nodes 136, and the like. Wireline means can include any direct connection that is not wireless including coaxial, fiber optic, and the like. Information appliance device 102 can, without limitation, be mounted in a vehicle such as an automobile, boat, aircraft, and the like, carried with a user, located in a stationary location, and the like.

As shown in FIG. 1, information appliance device 102 comprises a processor 104 with associated control algorithms 106 and memory 108. Memory 108 can include but is not limited to random access memory (RAM), read only memory (ROM) and other memory such as a hard disk, floppy disk, and/or other appropriate types of memory. Processor 104 and control algorithms 106 can initiate and perform communication with other wireless nodes 124, satellite 126, other wireline nodes 136, and the like, in accordance with suitable programs stored in memory 108.

Information appliance device 102 also comprises user interface device 110. User interface device 110 can comprise a plurality of user interface device resources which can include, without limitation, any number of displays 112, speakers 114, microphones 116, tactile interfaces 118, and the like.

As depicted in FIG. 1, information appliance device 102 also comprises a transmitter/receiver 120 for transmitting and receiving communications from other wireless nodes 124 via wireless link 128, from a satellite 126 via wireless link 130, and the like. Transmission can also occur using infrared and other light based communication. Other wireless nodes 124 can include, without limitation, a kiosk (fixed position source), cell site, local area network (LAN), telephone company, cable company, one or more servers, other information appliance devices, or any other information service, structure or entity that can transmit, receive and/or communicate information. An information service can be any desired service including but not limited to content delivery, telecommunications, broadband communications, entertainment, television, radio recorded music, movies, computer-based games, Internet, and other types of public, private, personal, commercial, government, and military communications.

Communications are transmitted and received through one or more antenna 122, which can include any one or combination of a fixed, steerable, omni-directional, or phased array antenna. Steerable antenna can include, but is not limited to, an electronically steerable antenna, physically steerable antenna, and the like. Any type of antenna that can transmit and receive communications is within the scope of the invention.

Information appliance device 102 can also comprise other devices 132, such as positioning devices, for example global positioning system (GPS), and the like. Other devices 132 can also comprise interfaces means for short-range wireless or wireline communication with other wireless devices, such as sensors within a vehicle, cellular handsets, computers, pagers, personal digital assistants (PDA's), games, printers, fax machines, television, Bluetooth™, and the like.

In an embodiment, the various components and systems in FIG. 1 can communicate with each other via wireline link 134, for example, a power/data/control bus, and the like. In another embodiment, the various components and systems in FIG. 1 can communicate via a wireless link. Wireline link 134 can also be used to communicate with other wireline nodes 136, for example, electronic devices listed above, other information appliance devices, and the like.

Figure 2:
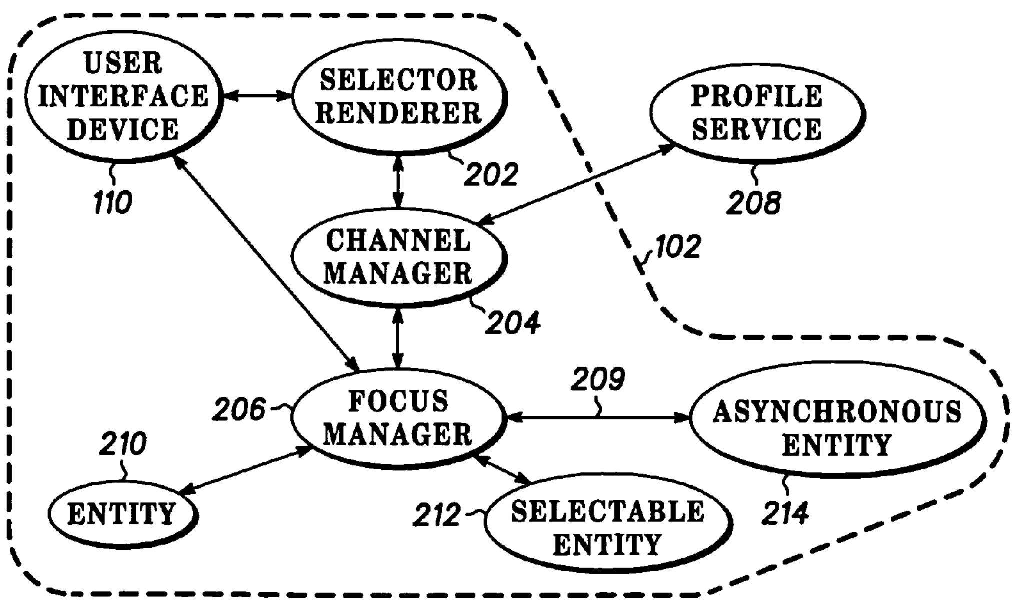
FIG. 2 depicts a block diagram of an embodiment of the invention.

FIG. 2 depicts a block diagram of an embodiment of the invention, which illustrates major functional software blocks of information appliance device 102. As shown in FIG. 2, information appliance device 102 includes user interface device 110 coupled to selector renderer 202 and focus manager 206. Information appliance device 102 also includes channel manager 204, which is coupled to focus manager 206, selector renderer 202 and profile service 208. Also shown in FIG. 2 are entity 210, selectable entity 212, and asynchronous entity 214 all coupled to focus manager 206. An asynchronous request 209, depicted by the arrow, is received by focus manager 206.

Entity 210 can include, without limitation, an application, computer program, service, feature, subsystem, and the like, of information appliance system 100. Entity 210 can be distributed on any number of nodes of information appliance system 100 or can reside entirely or in part in information appliance device 102. Entity 210 can also include, without limitation selectable entity 212 or asynchronous entity 214. In other words, selectable entity 212 and asynchronous entity 214 are subsets of entity 210. Entity 210 is disposed to utilize any of the plurality of user interface device resources. In an embodiment of the invention, selectable entity 212 can be called or selected. As an example of an embodiment of the invention, when selectable entity 212 is called, selectable entity 212 appears as a potential selection on user interface device 110 without actually being selected. In other words, when selectable entity 212 is called it can be highlighted or present a sample of selectable entity 212 without actually being selected. As another embodiment of the invention, selectable entity 212 can be selected, by either direct or indirect action on the part of for example, a user, another entity, and the like.

Selectable entity 212 can include, without limitation, applications that are selectable by a user, another application, subsystem, and the like, of the information appliance device 102. For example, selectable entity can include stock reporting applications, weather applications, navigation applications, news applications, audio and video applications, and the like, that are all selectable by a user, application, subsystem, and the like, of the information appliance device 102. Selectable entity 212 utilizes plurality of user interface device resources in order to interact with one or more users of information appliance device 102 and information appliance system 100 via user interface device 110.

Asynchronous entity 214 can include, without limitation, an application, service, subsystem, and the like, of the information appliance system 100 that is not selectable by, for example, the user or subsystem of information appliance device 102. Asynchronous request 209 is a non-user initiated or unpredictable request for the use of any of plurality of user interface device resources by asynchronous entity 214. Data associated with asynchronous request 209 can originate internally or externally to information appliance device 102. As shown in FIG. 2, asynchronous request 209 can request the use of any of plurality of user interface device resources on behalf of selectable entity 212 or asynchronous entity 214. As an example, asynchronous request 209 can request the use of plurality of user interface device resources on behalf of a route guidance application (which can comprise a selectable entity and/or an asynchronous entity) to deliver instructions to the driver of a vehicle such as an automobile, boat, aircraft, and the like. Asynchronous entity 214 can also include a service such as a maintenance reminder application in a vehicle, fire detection application, advertisement application, power management subsystem, audio and video subsystem, and the like. Asynchronous entity 214 can utilize plurality of user interface device resources in order to interact with one or more users of information appliance device 102 and information appliance system 100.

As shown in FIG. 2, entity 210, selectable entity 212 and asynchronous entity 214 are shown as part of information appliance device 102. In another embodiment, entity 210, selectable entity 212 and asynchronous entity 214 can be distributed throughout any number of nodes of information appliance system 100 and be coupled to focus manager 206. The invention can include more than one entity 210, selectable entity 212 and asynchronous entity 214. For example entity 210 can include a plurality of entities, selectable entity 212 can include a plurality of selectable entities and asynchronous entity 214 can include a plurality of asynchronous entities. Each of the entity 210, selectable entity 212 and asynchronous entity 214 can operate simultaneously, consecutively, and the like, with information appliance device 102. The scope of the invention is not limited to the configuration illustrated in FIG. 2.

As discussed above, user interface device 110 comprises a plurality of user interface device resources. These resources can be divided among, and utilized by, any number of entity 210, selectable entity 212 and asynchronous entity 214.

As shown in FIG. 2, channel manager functions to initialize each selectable entity 212 and manage the execution of each selectable entity 212 while selectable entity 212 is active on information appliance device 102. Channel manager 204 can be, without limitation, a hardwired device, software implemented on processor 104, and the like. Selector renderer 202 handles policy and how menus and selection choices for each selectable entity 212 "look and feel" on user interface device 110 of information appliance device 102. Selector renderer 202 receives input from user interface device and forwards input to channel manager 204 who then transmits input to entity 210. Selector renderer 202 can be, without limitation, a hardwired device, software implemented on processor 104, and the like.

Focus manager 206 controls access of entity 210, selectable entity 212, asynchronous entity 214 to user interface device 110, and particularly to plurality of user interface device resources. Focus manager allocates plurality of user interface device resources to each entity 210, selectable entity 212 and asynchronous entity 214. Focus manager 206 can be, without limitation, a hardwired device, software implemented on processor 104, and the like.

Information appliance system 100 includes profile service 208, which serves as a data store for plurality of entity attributes. Plurality of entity attributes include selectable entity attributes and asynchronous entity attributes. Plurality of entity attributes comprise data specific to each type of entity in information appliance system 100. For example, plurality of entity attributes for asynchronous entity 214 can include, without limitation, type of entity (i.e. stock reporting, weather, navigation, service), importance factor for asynchronous entity 214, and the like. Importance factor can be used to determine priority of asynchronous request 209 as discussed below. Profile service 208 can without limitation, be a data store internal and/or external to information appliance device 102, including a distributed data store among other wireless nodes 124.

Any method of storing, retrieving, transmitting and receiving data can be included in profile service 208. For example, and without limitation, profile service 208 can comprise a distributed database within one or more remote servers, with plurality of entity attributes transmitted to channel manager 204 using wireless or wireline communication means.

Profile service 208 can also communicate with other software blocks shown in FIG. 2. For example, profile service 208 can contain entity attributes, which contain data specific to entities or types and classes of entities. Although profile service 208 is shown external to information appliance device 102, profile service can be included in information appliance device 102 as well as part of the distributed database described above.

Figure 3:
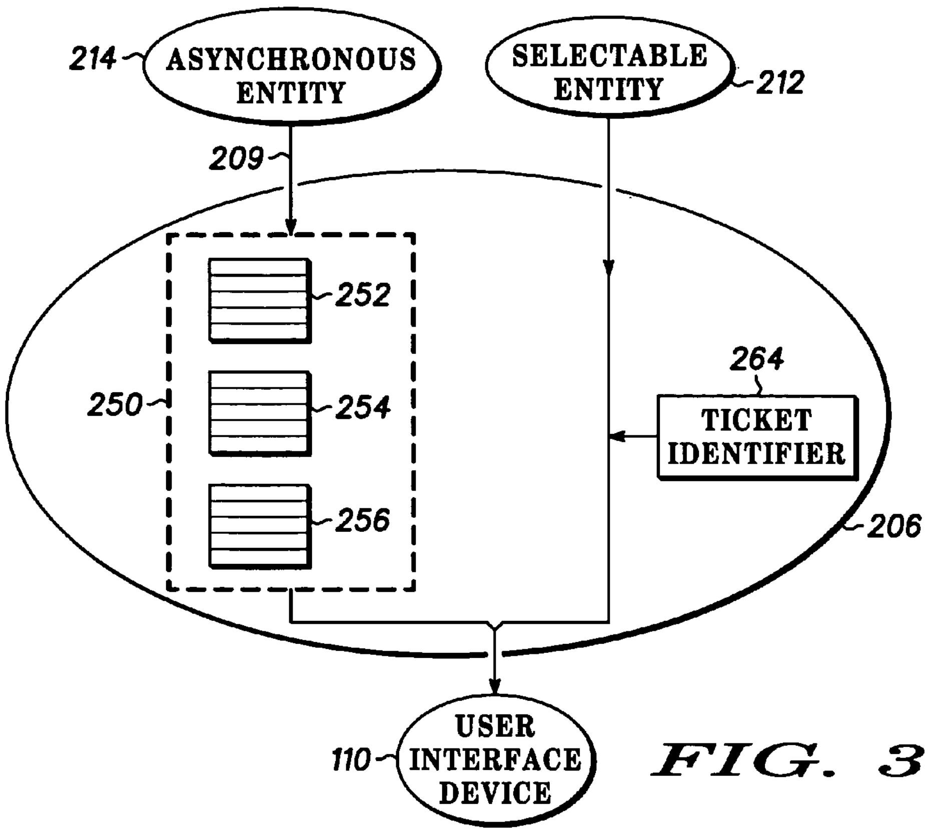
FIG. 3 depicts an embodiment of a focus manager.

FIG. 3 depicts an embodiment of a focus manager 206. Focus manager 206 functions to manage plurality of entities 210, which include plurality of selectable entities 212 and plurality of asynchronous requests 209. As shown in FIG. 3, focus manager 206 includes a queue 250 and a means of assigning ticket identifier 264 to selectable entity 212. Queue 250 comprises any number of priority levels, which can include without limitation, any number of sub-queues. The priority level to which asynchronous request 209 is assigned determines when corresponding asynchronous entity 214 will be able to utilize any of plurality of user interface device resources. In the embodiment depicted in FIG. 3, queue 250 includes three priority levels, or sub queues, which include 0 time priority level 252, 1 st time priority level 254 and 2nd time priority level 256. However, the invention is not limited by the number or type of priority levels 252, 254, 256 depicted in FIG. 3. Any number or type of priority levels 252, 254, 256 are within in the scope of the invention.

When selectable entity 212 is called, focus manger 206 assigns ticket identifier 264 to selectable entity 212. Ticket identifier 264 can determine which of selectable entity 212 can, or is able to, utilize any of plurality of user interface device resources. In an embodiment of the invention and without limitation, ticket identifier 264 can include a unique serial number. In another embodiment of the invention, focus manager 206 assigns ticket identifier 264 to selectable entity 212 when selectable entity 212 is selected via user interface device 110. In another embodiment, once ticket identifier 264 is obtained, selectable entity 212 must also choose to take over and utilize plurality of user interface device resources.

In another embodiment of the invention, focus manager 206 stores asynchronous request 209 in queue 250 and assigns a priority level 252, 254, 256. As an example, asynchronous request 209 can have a 0 time priority associated with it, meaning that asynchronous request 209 is urgent and that corresponding asynchronous entity 214 must utilize plurality of user interface device resources immediately. Therefore, asynchronous request 209 is placed in 0 time priority level 252. If asynchronous request 209 is less urgent, it can be placed in 1 st time priority level 254, 2nd time priority level 256, and the like, based on the priority level associated with asynchronous request 209.

Figure 4:
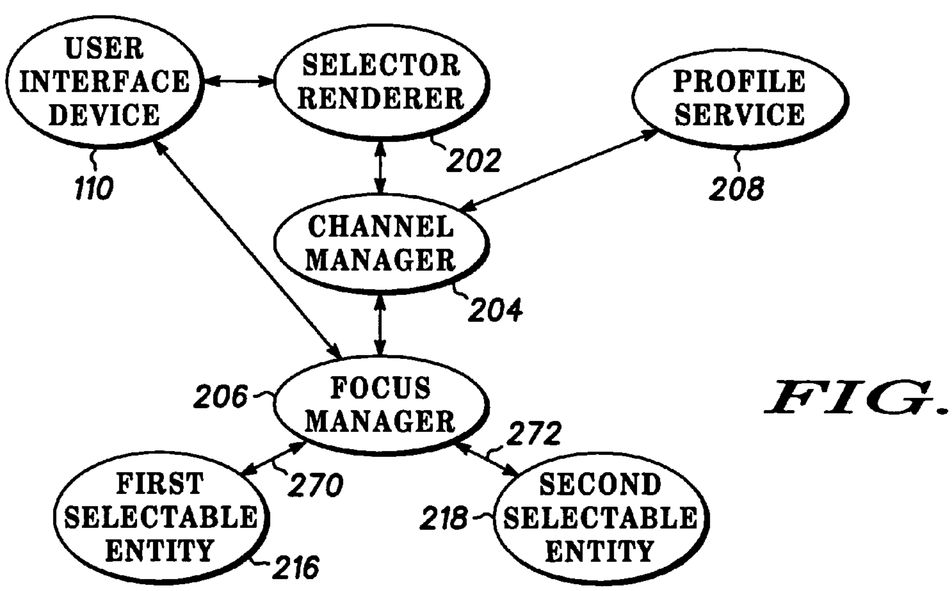
FIG. 4 depicts a block diagram of another embodiment of the invention.

FIG. 4 depicts a block diagram of another embodiment of the invention. As shown in FIG. 4, selectable entity 210 comprises first selectable entity 216 and second selectable entity 218, which are coupled to focus manager 206. First selectable entity 216 is called at a first time and assigned a first ticket identifier 270 and second selectable entity 218 is called at a second time and assigned a second ticket identifier 272, where second time is after first time. Therefore, first ticket identifier 270 is assigned before second ticket identifier 272. In the embodiment of the invention depicted in FIG. 4, first selectable entity is called first and assigned first ticket identifier 270. Since first ticket identifier 270 is the latest ticket identifier assigned, first selectable entity 216 utilizes plurality of user interface device resources. When second selectable entity 218 is called and assigned second ticket identifier 272, second selectable entity 218 can take over and utilize plurality of user interface device resources since second ticket identifier 272 is assigned after first ticket identifier. Focus manager 206 removes control of plurality of user interface device resources from first selectable entity and gives control of plurality of user interface device resources to second selectable entity 218.

In another embodiment of the invention, plurality of user interface device resources can comprise any number of sets of one or more user interface device resources, for example, and without limitation, a first and second set of the plurality of user interface device resources that are mutually exclusive. For example, first set of plurality of user interface device resources can include background audio functions, and second set of plurality of user interface device functions can include display(s) 112, a portion of speaker(s) 114, microphone 116 and tactile interface 118. Any combination of plurality of user interface device resources can be divided into first and second set of plurality of user interface device resources. In an embodiment of the invention, first selectable entity 216 can utilize first set of plurality of user interface device resources and second selectable entity 218 can utilize second set of plurality of user interface device resources after second time. In effect, both first and second selectable entities 216, 218 are utilizing a mutually exclusive set of plurality of user interface device resources simultaneously after second selectable entity 218 is called at second time.

In another embodiment, first selectable entity 216 can continue to utilize plurality of user interface device resources after second selectable entity 218 is called at second time. In yet another embodiment, selectable entity 212 can be called and issued ticket identifier 264 and not take over and utilize plurality of user interface device resources. In still another embodiment of the invention, selectable entity 212 can assign ticket identifier 264 to entity 210 which can include, without limitation, one or more applications, application components, services, different selectable entity 212, and asynchronous entity 214.

It is desired to be understood, that the invention is not limited to two selectable entities or two sets of plurality of user interface device resources. The invention includes any number of selectable entities and any number of sets of plurality of user interface device resources.

Referring again to FIG. 3, asynchronous request 209 is received by focus manager 206, assigned priority level 252, 254, 256 and stored in queue 250. Based on the priority level 252, 254, 256, corresponding asynchronous entity 214 takes control and utilizes plurality of user interface device resources. If entity 210 (see FIG. 2) is currently utilizing plurality of user interface device resources, asynchronous entity 214 will take control and utilize plurality of user interface device resources based on the priority level 252, 254, 256, and return control of plurality of user interface device resources to entity 210 when asynchronous entity 214 is complete.

As an example of an implementation of the above embodiment, a navigation asynchronous entity that is giving real-time directions to the driver of a vehicle will have a high priority because of the nature of real-time directions makes the information that asynchronous entity is providing perishable. Consequently a navigation asynchronous request of this type will be assigned to 0 time priority level 252 so that corresponding asynchronous entity 214 can take control of user interface device resources from another other entity currently controlling user interface device resources. On the other end of the spectrum, is an asynchronous entity which functions to track and notify the user of a vehicle of vehicle maintenance checks (i.e. oil change required, rotate tires, etc.). In this instance, an asynchronous request corresponding to this asynchronous entity will have a priority level lower than 0 time priority level 252. For example, vehicle maintenance asynchronous request can be placed in 2nd time priority level 256. The priority level assigned to asynchronous request 209 controls when corresponding asynchronous entity 214 takes control of user interface device resources.

Priority level 252, 254, 256 prioritize each of asynchronous requests contained therein. For example, an asynchronous request in priority level 254 may not interrupt and attempt to take resources from another asynchronous entity that was implemented through an asynchronous request from the same priority level 254.

In an embodiment of the invention, the priority level 252, 254, 256 is comprised of an importance factor and an urgency factor. In other words, which priority level 252, 254, 256 asynchronous request 209 is assigned to can be determined by importance factor and urgency factor. Importance factor can be one of the plurality of asynchronous entity attributes that is stored in information appliance system 100 or locally, in information appliance device 102. Importance factor is a trusted measure of the relative importance of asynchronous request 209 that can determine what priority level 252, 254, 256 asynchronous request 209 is assigned in queue 250 of focus manager 206. Importance factor is trusted because it is administratively assigned by an administrator of information appliance system 100 and is independent of third party owners, creators, programmers, and the like, of corresponding asynchronous entity 214. In an embodiment, importance factor can be a multiplier based on the relative importance of a particular type or individual asynchronous entity 214.

Urgency factor is an untrusted means that asynchronous entity 214 uses to prioritize corresponding asynchronous request 209 in queue 250. Urgency factor is untrusted because it is supplied by a creator of asynchronous entity 214 via asynchronous request 209. Urgency factor is a means for asynchronous request 209 to inform focus manager 206 of the relative urgency of asynchronous request 209 relative to any other entity 210 coupled to information appliance system 100. In an embodiment, urgency factor can be a multiplier based on the relative urgency of a particular type or individual asynchronous entity 214.

In an embodiment of the invention, importance factor and urgency factor are combined to create priority level 252, 254, 256. As an example, and without limitation, importance factor and urgency factor can be added together, multiplied by each other, and the like. For instance, importance factor and urgency factor could each have a range of 0–1.0 with 0 being the least important or urgent and 1.0 being the most important or urgent. Utilizing this methodology, an administrator of information appliance system can control the maximum priority level 252, 254, 256 assigned to a particular type or individual asynchronous request 209 regardless of the urgency factor assigned to asynchronous request 209 by its creator. For example, by limiting the importance factor for asynchronous request 209 to a maximum value, priority level 252, 254, 256 assigned to asynchronous request 209 will never be above a particular priority level 252, 254, 256.

In an embodiment, asynchronous request 209 is received by focus manager 206 and assigned a 0 time priority level 252, in which corresponding asynchronous entity 214 takes control of plurality of user interface device resources immediately. In another embodiment, asynchronous request 209 is received by focus manager at a receipt time and assigned a priority level that is not in the 0 time priority level 252. For example, asynchronous request 209 can be assigned to 1 st time priority level 254, 2nd time priority level 256, and the like. In this example, corresponding asynchronous entity 214 does not take control of plurality of user interface device resources immediately, but takes control at an implementation time, which is after the receipt time. The difference between receipt time and implementation time is controlled by priority level 252, 254, 256 assigned to asynchronous request 209.

For example, 1 st time priority level 254 can have a five-minute difference between receipt time and implementation time associated with it. The five-minute difference means that corresponding asynchronous entity 214 will not be eligible take control of plurality of user interface device resources until up to five minutes after receipt time, in the case when entity 210 already has control of user interface device resources.

As another example, asynchronous request 209 assigned to 1 st priority level 254 can allow corresponding asynchronous entity 214 to take control of plurality of user interface device resources before the implementation time designated by 1 st priority level 254. This can happen when one entity ends, thereby giving up control of user interface device resources, but before another entity begins and attempts to take control of user interface device resources. Asynchronous entity 214 can take over control of plurality of user interface device resources during the interlude between entities, asynchronous entities, any combination thereof, and the like.

In another embodiment, asynchronous entity 214 returns control of user interface device resources to entity 210 only after acknowledgement of asynchronous entity 214. For example, a navigation asynchronous entity that is giving real time driving directions to an operator of a motor vehicle can choose to return control of plurality of user interface device resources only after a change in direction given by the navigation asynchronous entity is completed. In another example, an emergency phone call received on user interface device 110 via an asynchronous request 209 utilizing corresponding asynchronous entity 214 can choose to not return control of plurality of user interface device resources until acknowledgment by the intended recipient of the emergency call. Acknowledgment can include any reaction to asynchronous entity 214 by the user, information appliance device 102, an application, and the like. It is desired to be understood, that the invention is not limited by these examples, and that other embodiments are within the scope of the invention.

In an embodiment, asynchronous entity 214 can take control of a first set of plurality of user interface device resources from entity 210, and utilize the first set while entity 210 continues to utilize the remaining plurality of user interface device resources. For example, asynchronous entity 214 can take control of foreground user interface device resources, which can include display(s), and tactile interface, while entity 210 retains control over background audio functions. Plurality of user interface device resources can be divided into any number of mutually exclusive sets of user interface device resources. These mutually exclusive individual sets can each be utilized by an entity, either selectable or asynchronous, as described above.

Figure 5:
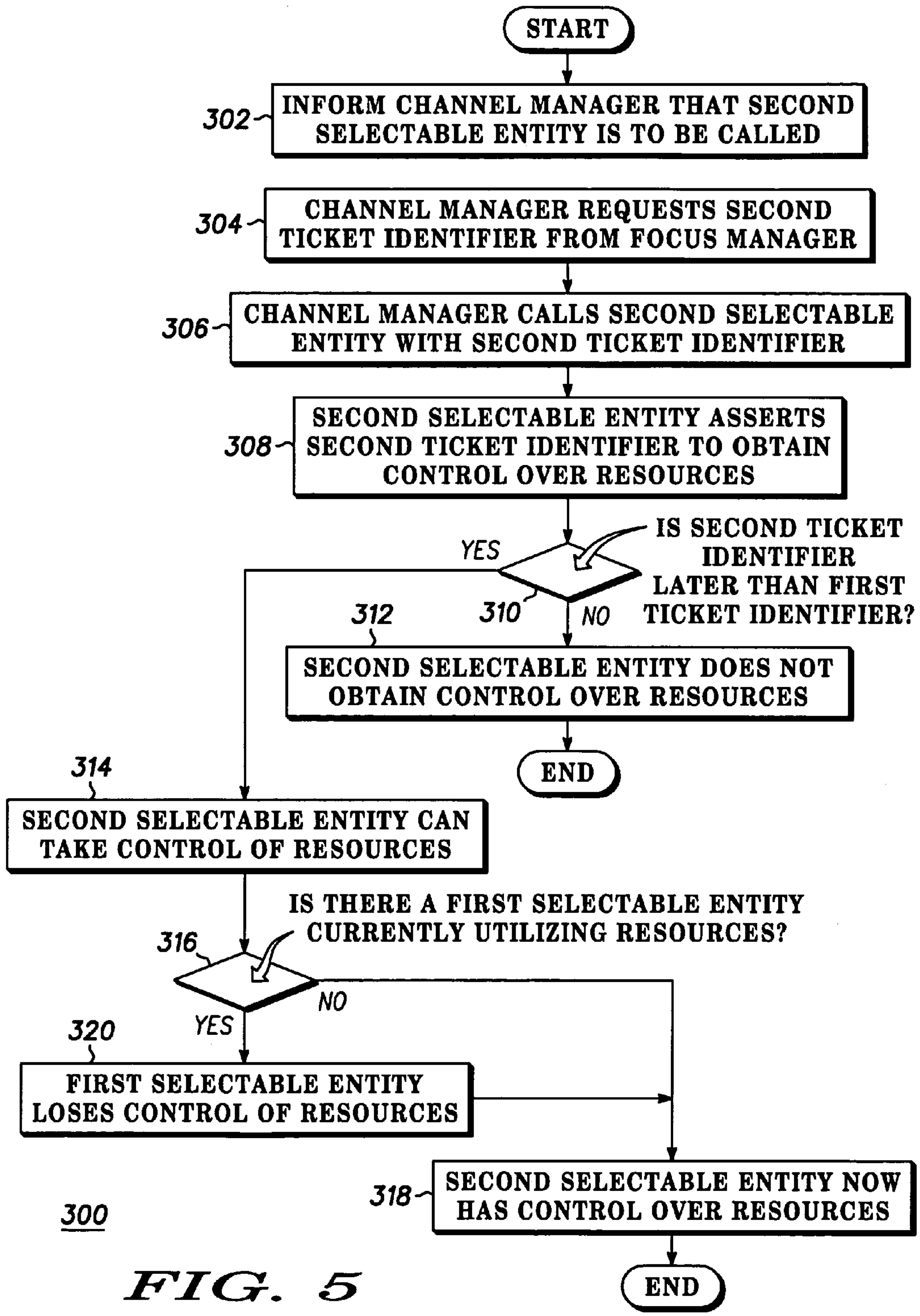
FIG. 5 depicts a flow chart of an embodiment of the invention.

FIG. 5 depicts a flow chart 300 of an embodiment of the invention. The steps shown in FIG. 5 illustrate an embodiment of managing a plurality of selectable entities 212. At step 302, channel management 204 is informed that second selectable entity 218 is to be called. Calling can occur through actions of the user, the information appliance device 102, any sort of chooser, device, mechanism, computer program, application, and the like. In step 304, channel manager 204 requests second ticket identifier 272 from focus manager 206. In step 306, channel manager calls second selectable entity 218 with second ticket identifier 272. In step 308, second selectable entity 218 attempts to assert second ticket identifier 272 to take control over plurality of user interface device resources.

In step 310, focus manager 206 determines if second ticket identifier 272 is later than first ticket identifier 270. As an example, second ticket identifier 272 can be later than first ticket identifier 270 if it has a higher serial number than first ticket identifier 270. If second ticket identifier 272 is not later than first ticket identifier 270, in step 312, second selectable entity 218 does not obtain control over the requested resources. If second ticket identifier 272 is later than first ticket identifier 270, in step 314, second selectable entity 218 can take control over plurality of user interface device resources. The above process is repeated for each of the plurality of user interface device resources that second selectable entity 218 wishes to utilize, as each of these resources can already be controlled by a different selectable entity with a different ticket identifier. In some instances, second selectable entity 218 may not be able to take control of certain of plurality of user interface device resources that it requests because a different selectable entity has a later ticket identifier. In step 316, focus manager 206 determines if there is a first selectable entity currently utilizing plurality of user interface device resources. If the answer is "Yes," in step 320, first selectable entity 216 loses control over resources and in step 318, second selectable entity now has control over resources.

Figure 6:
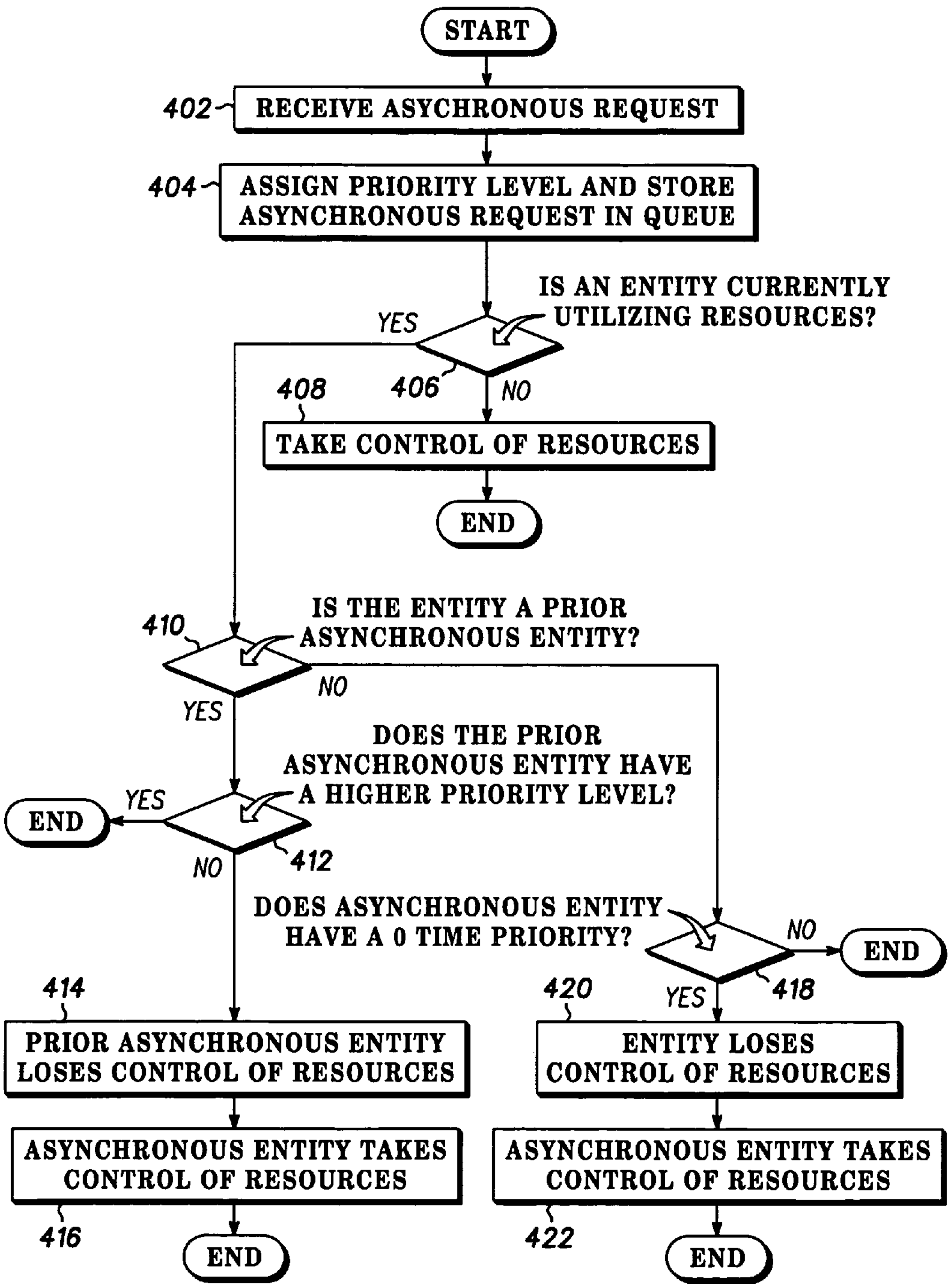
FIG. 6 depicts a flow chart of another embodiment of the invention.

FIG. 6 depicts a flow chart 400 of another embodiment of the invention. The steps shown in FIG. 6 illustrate an embodiment of managing an asynchronous request 209. In step 402, focus manager 206 receives asynchronous request 209, and in step 404, focus manager 206 assigns a priority level 252, 254, 256 as described above and stores asynchronous request 209 in queue 250. In step 406, focus manager determines if an entity 210 is currently utilizing plurality of user interface device resources. If the answer is "No," in step 408, asynchronous entity 214 corresponding to asynchronous request 209 takes control of user interface device resources. If the answer in step 406 is "Yes," in step 410, focus manager 206 determines if entity 210 that is currently utilizing resources is a prior asynchronous entity. If the answer in step 410 is "Yes," in step 412, focus manger 206 further determines whether the prior asynchronous entity has a higher priority level. If the answer in step 412 is "No," in step 414, prior asynchronous entity loses control of plurality of user interface device resources, and in step 416, asynchronous entity 214 takes control of user interface device resources. If the answer in step 412 is "Yes," then asynchronous request is placed in queue 250 in priority level 252, 254, 256 in accordance with the importance factor and urgency factor described above.

If the determination in step 410 as to whether entity 210 is a prior asynchronous entity is "No," in step 418, focus manager 206 determines if asynchronous request 209 has a 0 time priority. If the answer is "No," asynchronous request 209 awaits its turn in queue 250 in priority level 252, 254, 256 as described above. If the answer in step 418 is "Yes," in step 420 entity 210 loses control of plurality of user interface device resources, and in step 422, corresponding asynchronous entity 214 takes control of resources. Once asynchronous entity 214 takes control of plurality of user interface device resources, it utilizes them, thereafter returning control of plurality of user interface device resources to entity 210, which can be a different entity than the original entity that gave up control of user interface device resources.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. An information system that manages asynchronous requests for user interface resources, the system comprising:
- an information device having a user interface that includes a plurality of resources;
- a non-user-selectable application operable to utilize the plurality of user interface device resources;
- an application manager operable to input information from the applications, wherein the manager comprises a queue; and
- an asynchronous request from the asynchronous application is operable to request any of plurality of the user interface device resources, wherein the asynchronous request is received by the application manager, wherein the asynchronous request is stored in the queue and assigned a priority level, wherein based on the priority level the asynchronous application; interrupts access to the user interface resources by a lower-priority application, takes control of the plurality of user interface device resources from the lower priority application, utilizes the plurality of user interface device resources, and relinquishes control of the plurality of user interface device resources.

2. The information system of claim 1, wherein the priority level is comprised of an importance factor and an urgency factor, wherein the importance factor is stored on the information system, and wherein the urgency factor is supplied by the asynchronous application.

3. The information system of claim 2, further comprising a plurality of asynchronous application attributes, wherein the plurality of asynchronous application attributes are stored in the information system, and wherein the plurality of asynchronous application attributes comprise the importance factor.

4. The information system of claim 2, wherein the importance factor and the urgency factor are combined to create the priority level.

5. The information system of claim 1, wherein the asynchronous application relinquishes control of the plurality of user interface device resources upon acknowledgment of the asynchronous application.

6. The information system of claim 1, wherein the asynchronous entity takes control of the plurality of user interface device resources immediately.

7. The information system of claim 1, wherein the asynchronous request is received by the application manager at a receipt time, wherein the asynchronous application takes control of the plurality of user interface device resources at an implementation time, wherein the implementation time is after the receipt time, and wherein a difference between the implementation time and the receipt time is controlled by the priority level.

8. The information system of claim 1, wherein the asynchronous application takes control of a first set of the plurality of user interface device resources, and wherein the asynchronous application utilizes the first set of the plurality of user interface device resources.

9. The information system of claim 1, wherein the asynchronous application relinquishes control of the user interface resources to one of the group of the application that was interrupted and another application in the queue.

10. The information system of claim 1, wherein the asynchronous application includes a service.

11. The information system of claim 1, wherein the asynchronous application includes a subsystem.

12. A method of managing asynchronous requests for user interface resources in an information system, the method comprising the steps of:

providing an information device having a user interface that includes a plurality of resources;

providing a non-user-selectable application operable to utilize the plurality of user interface device resources;

providing an application manager operable to input information from the applications, wherein the manager comprises a queue;

providing an asynchronous request from the asynchronous application is operable to request any of plurality of the user interface device resources, wherein the asynchronous request is received by the application manager;

assigning a priority level to the asynchronous request;

storing the asynchronous request in the queue; wherein based on the priority level:

having asynchronous entity:

interrupt access to the user interface resources by a lower-priority application;

take control of the plurality of user interface device resources from the lower priority application;

utilizing the plurality of user interface device resources; and relinquishing control of the plurality of user interface device resources.

13. The method of claim 12, wherein assigning a priority level comprises assigning an importance factor and an urgency factor, wherein the importance factor is stored on the information system, and wherein the urgency factor is supplied by the asynchronous request.

14. The method of claim 13, further comprising providing a plurality of asynchronous application attributes, wherein the plurality of asynchronous application attributes are stored in the information system, and wherein the plurality of asynchronous application attributes comprise the importance factor.

15. The method of claim 13, further comprising combining the importance factor and the urgency factor to create the priority level.

16. The method of claim 12, wherein relinquishing control of the plurality of user interface device resources comprises relinquishing control of the plurality of user interface device resources upon acknowledgment of the asynchronous entity.

17. The method of claim 12, wherein taking control of the plurality of user interface device resources comprises taking control of the plurality of user interface device resources immediately.

18. The method of claim 12, further comprising providing a receipt time, wherein the asynchronous request is received by the application manager at the receipt time, providing an implementation time, wherein the asynchronous application takes control of the plurality of user interface device resources at the implementation time, wherein the implementation time is after the receipt time, and wherein a difference between the implementation time and the receipt time is controlled by the priority level.

19. The method of claim 12, further comprising taking control of a first set of the plurality of user interface device portions, and wherein the asynchronous application utilizes the first set of the plurality of user interface device portions.

20. The method of claim 12, wherein the relinquishing step comprises relinquishing control of the plurality of user interface device resources to one of the group of the application that was interrupted and another application in the queue.

* * * * *